United States Patent [19]
Ikuta et al.

[11] 3,970,827
[45] July 20, 1976

[54] ELECTRONIC TAXI FARE METER

[75] Inventors: Hiroshi Ikuta, Nagoya; Takaaki Kato, Toyohashi, both of Japan

[73] Assignee: Nippondenso Co., Ltd., Kariya, Japan

[22] Filed: Nov. 20, 1974

[21] Appl. No.: 525,666

[30] Foreign Application Priority Data

| Dec. 4, 1973 | Japan | 48-136360 |
| Dec. 4, 1973 | Japan | 48-136361 |
| Dec. 6, 1973 | Japan | 48-138415 |
| June 21, 1974 | Japan | 49-71609 |

[52] U.S. Cl. .................. 235/92 TC; 235/92 DM; 235/92 CP; 235/92 DN; 235/92 R; 235/30 R
[51] Int. Cl.² .......................................... G07B 13/10
[58] Field of Search ...... 235/92 TC, 92 DM, 92 PE, 235/92 CP, 92 DN, 30 R

[56] References Cited
UNITED STATES PATENTS

| 3,388,859 | 6/1968 | Kelch et al. | 235/30 R |
| 3,703,985 | 11/1972 | Berg | 235/30 R |
| 3,736,408 | 5/1973 | Kienzle | 235/30 R |
| 3,818,186 | 6/1974 | Harwood | 235/30 R |
| 3,843,870 | 10/1974 | Craddock | 235/30 R |
| 3,843,874 | 10/1974 | Kelch | 235/92 TC |
| 3,880,350 | 4/1975 | Iwatani et al. | 235/92 TC |

*Primary Examiner*—Joseph M. Thesz
*Attorney, Agent, or Firm*—Cushman, Darby & Cushman

[57] ABSTRACT

There is provided an electronic taxi fare meter wherein the tariff travel distance and the tariff travel time of a taxi are converted into pulse signals representing digital quantities, and these pulse signals are increased by a premium fare computing circuit comprising a combination of counters. The premium fare mechanism is thus reduced in size and weight as compared with the conventional mechanisms of the mechanical type, and accurate computation of the fares at premium rates can also be effected for both the tariff travel distance and the tariff travel time of a taxi. Further, the use of the digital techniques makes the apparatus less susceptible to supply voltage variations and ambient temperature changes, makes the designing of the apparatus with integrated circuits possible, and ensures a higher degree of reliability in the operation of the apparatus.

18 Claims, 10 Drawing Figures

ELECTRONIC TAXI FARE METER

BACKGROUND OF THE INVENTION

1. Field of the Invention

The present invention relates to a computing circuit for an electronic taxi fare meter which computes the tariff travel distance as well as the tariff travel time of a taxi.

2. Description of the Prior Art

Taxi fare meters heretofore known in the art are entirely of the mechanical type which employ a gear and cam mechanism and in which the premium fare mechanism effects the calculation of the premium fares on the distance of trips by properly changing the number of teeth in the gears, but there is no means for the calculation of premium fares on the travel times. Therefore, the disadvantages of these conventional meters are possibility of errors in the measurement of the distance of trips due to the wear of the gears in service, danger of malfunctions due to any improper engagement of the gears, and the absence of any suitable mechanical means for the calculation of premium fares on the time rate basis.

Another disadvantage is that where the basic distance and the fixed unit distance subsequent to the basic distance (hereinafter referred to as a fixed additional distance) differ for different business areas of taxis or for different classes of taxis, cumbersome procedures are required such as the adjustment of the gears in the taxi fare meter, the changing of fare indicating plates, etc.

Still another disadvantage of the conventional taxi fare meters is that the switching from the distance rate system to the time rate system takes place when the speed of a taxi drops below a predetermined threshold speed, and therefore malfunctions tend to occur in the vicinity of the threshold speed, thus giving rise to problems from the standpoint of accuracy.

SUMMARY OF THE INVENTION

It is an object of the present invention to provide an electronic taxi fare meter in which the tariff travel distance as well as the tariff travel time of a taxi are converted into pulse signals representing digital quantities, and the pulse signals are increased by a premium fare computing circuit comprising a combination of counters, whereby the premium fare mechanism is reduced in size and weight as compared with the conventional mechanisms of the mechanical type, the computation of the fares at premium rates can also be accomplished for both the tariff travel distance and the tariff travel time accurately, and the use of the digital techniques has the effect of making the apparatus less susceptible to supply voltage variations and ambient temperature changes, making the designing of the apparatus with integrated circuits possible, and ensuring a higher degree of reliability in the operation of the apparatus.

It is another object of the present invention to provide an electronic taxi fare meter of the above type which includes switching mechanisms such as switches for changing the basic distance and the fixed additional distance for different business areas and classes of taxis, whereby the basic distance as well as the fixed additional distance can be changed by simply changing the combination of the opening and closing of the switches.

It is still another object of the present invention to provide an electronic taxi fare meter of the above type which includes a counter circuit for counting the number of clock pulse signals for every half period of the distance pulse signals and a discrimination circuit by which whether the vehicle speed is higher or lower than a given value, e.g., a threshold vehicle speed is determined in accordance with the count of the counter circuit, whereby virtue of the use of the digital counting means, the accuracy of switching between the counting of duration pulse signals and the counting of distance pulse signals is highly improved, and the time required for the discrimination of the vehicle speed is decreased owing to the fact the discrimination can be effected during the time interval of the half period of the distance pulse signals.

It is still another object of the present invention to provide an electronic taxi fare meter of the above type wherein in response to the switching of the counting modes by the discrimination circuit, a frequency dividing circuit is reset to initiate the frequency division of the clock pulse signals, and the thus divided reference signals are used as duration pulse signals, thereby providing synchronism between the distance pulse signals and the duration pulse signals and thus ensuring that the counting of the duration pulse signals is commenced with greater accuracy.

It is still another object of the present invention to provide an electronic taxi fare meter of the above type in which electrical signals indicative of the driving conditions of a taxi can be delivered without causing any malfunctions of the computing section of the taxi fare meter through protective circuits for protecting the internal circuits of the computing section against damages.

BRIEF DESCRIPTION OF THE DRAWINGS

The above and other objects, features and advantages of the present invention will become readily apparent from considering the following detailed description taken in conjunction with the accompanying drawings, in which.

DESCRIPTION OF THE PREFERRED EMBODIMENTS

Figure 1:
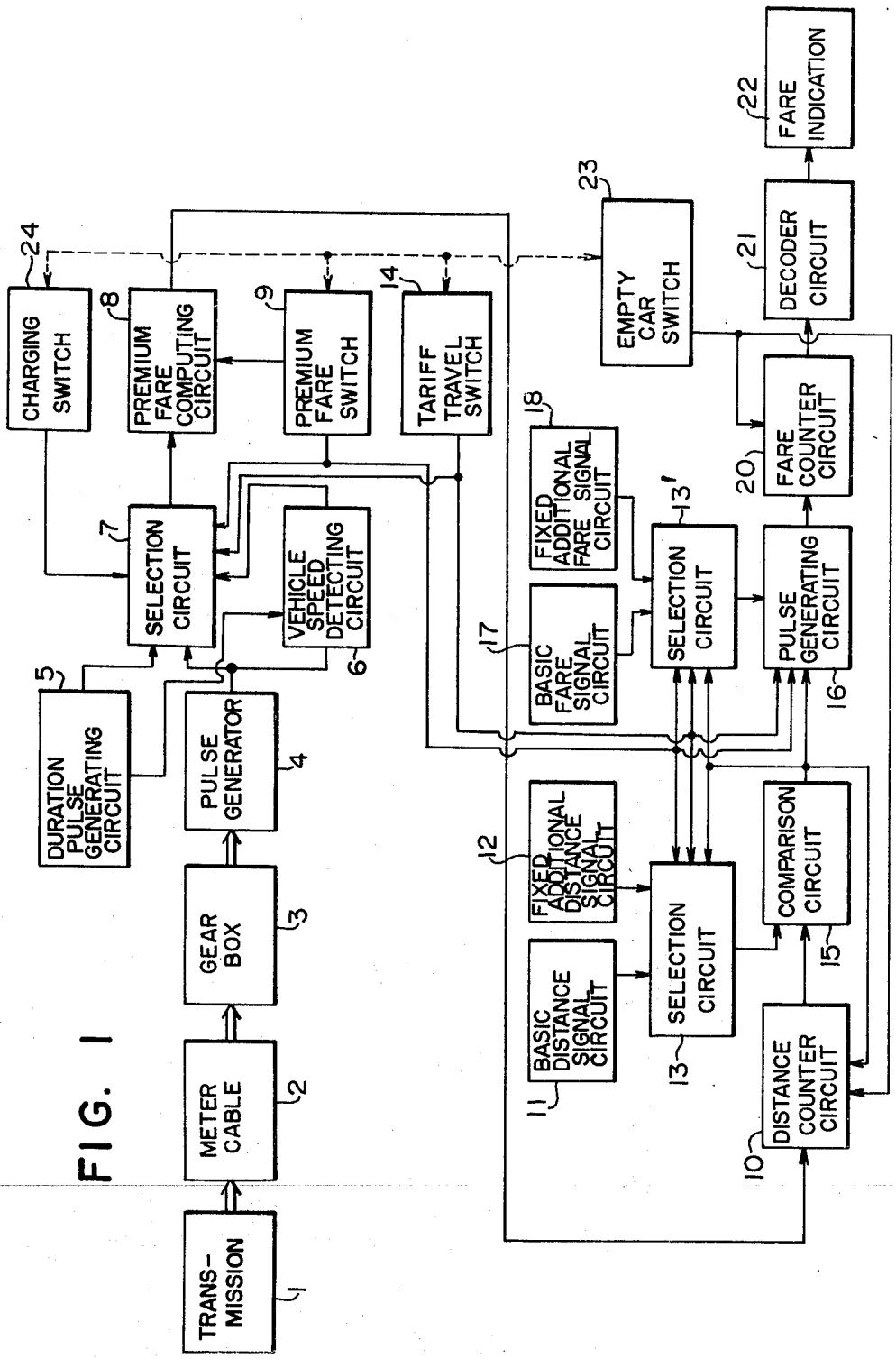
FIG. 1 is a block diagram showing an embodiment of an electronic taxi fare meter according to the present invention.
Figure 2:
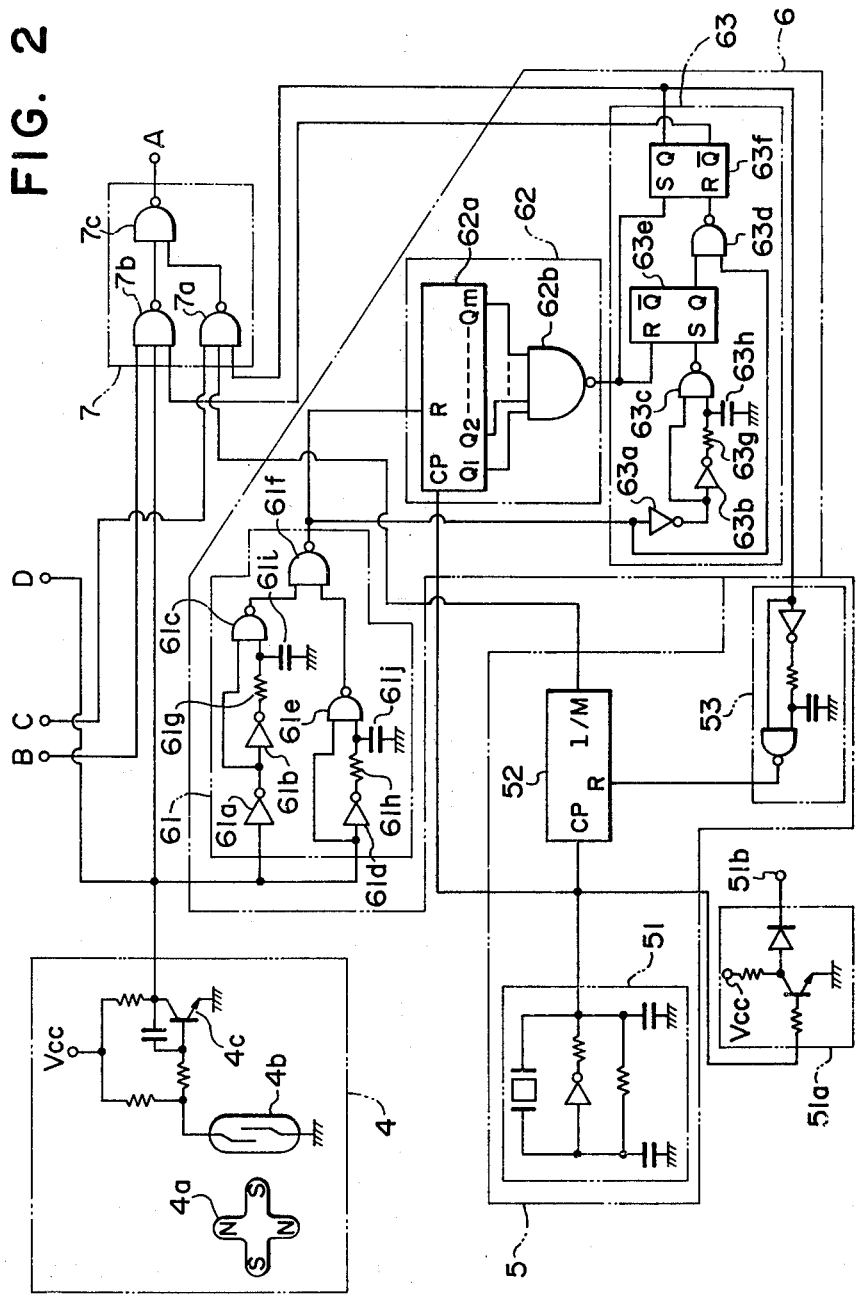
FIGS. 2, 3 and 4 are wiring diagrams showing specific circuit constructions of some of the circuits used in the embodiments of FIGS. 1 and 8.
Figure 4:
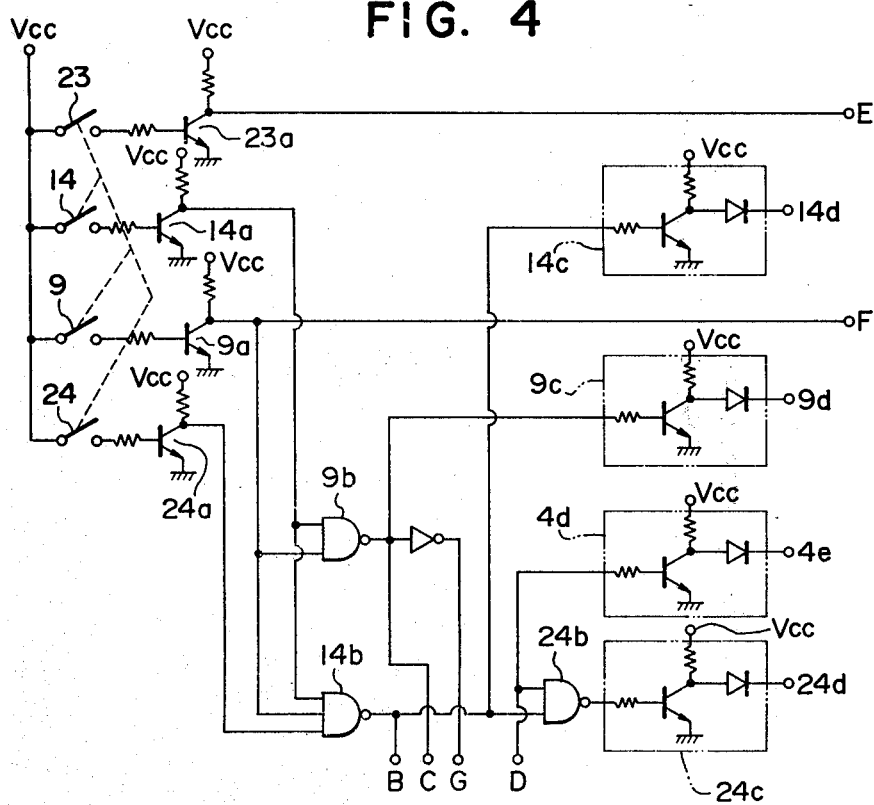
Figure 5:
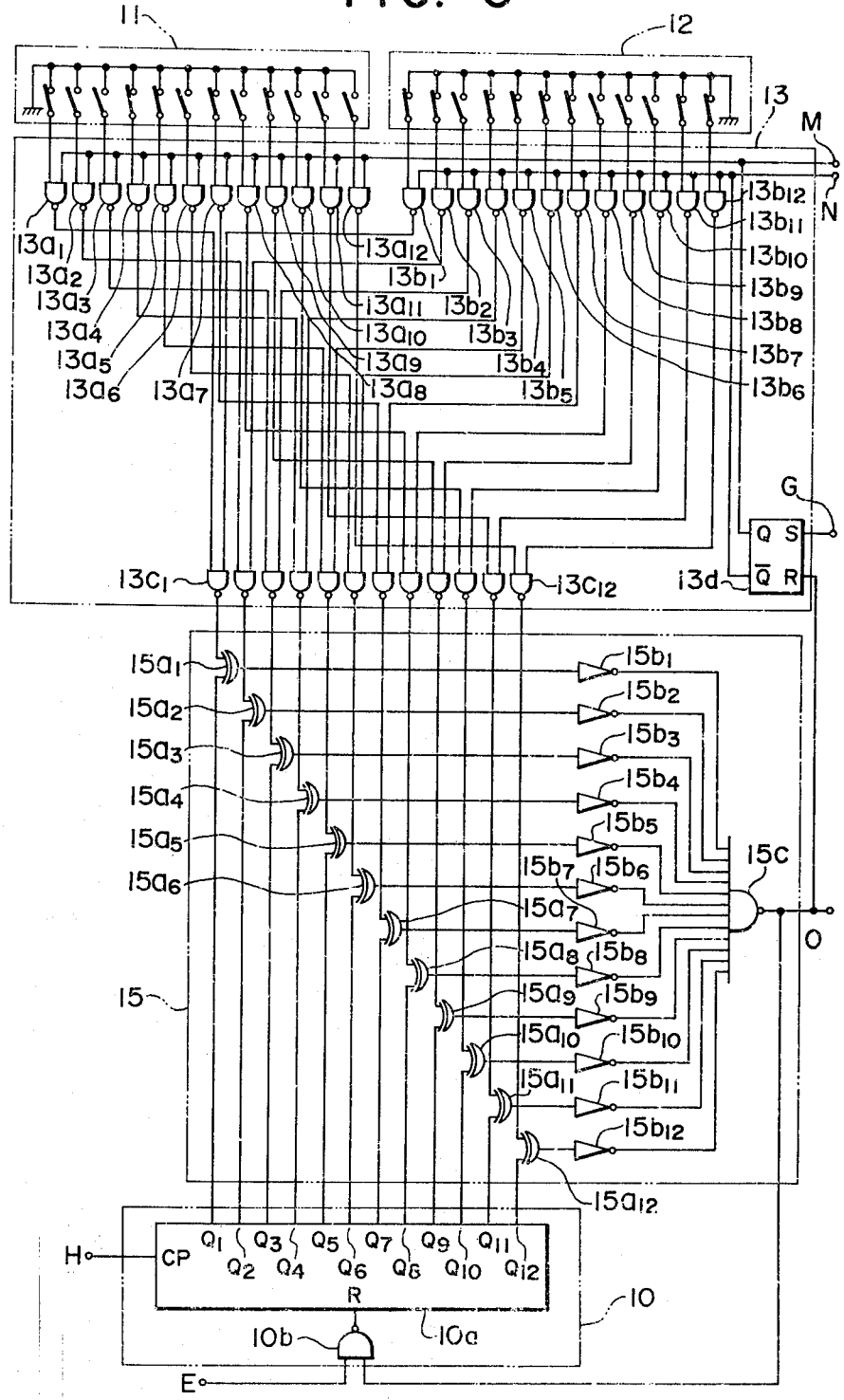
FIGS. 5 and 6 are wiring diagrams showing specific circuit constructions of other circuits used in the embodiments of FIGS. 1 and 8.
Figure 6:
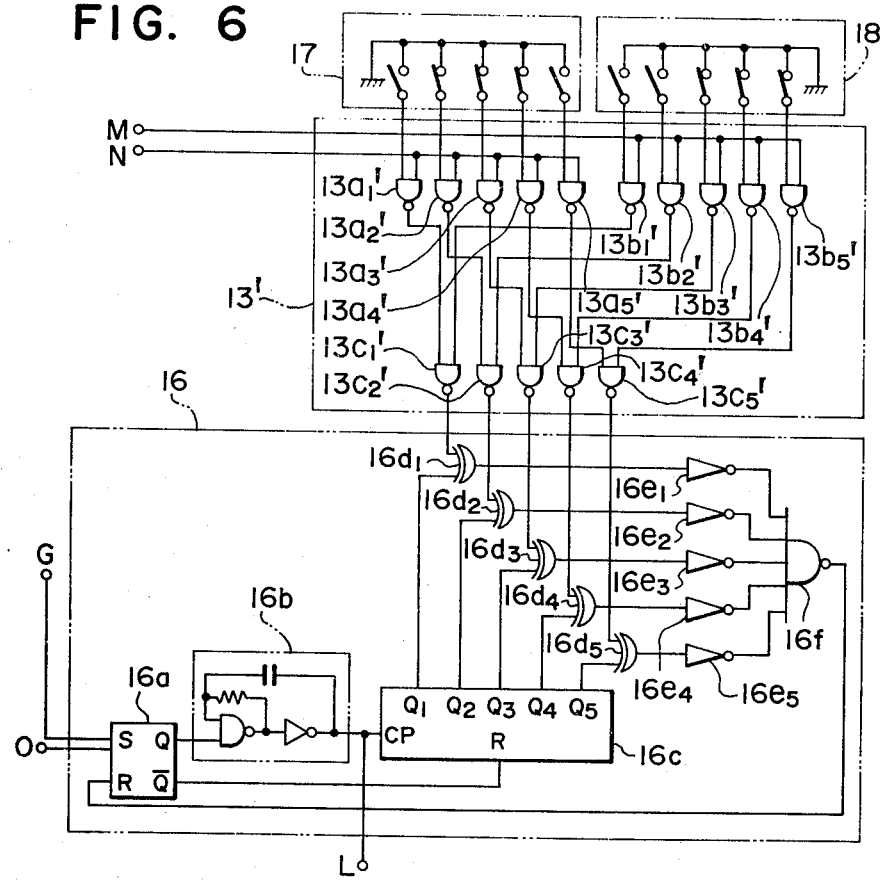
Figure 7:
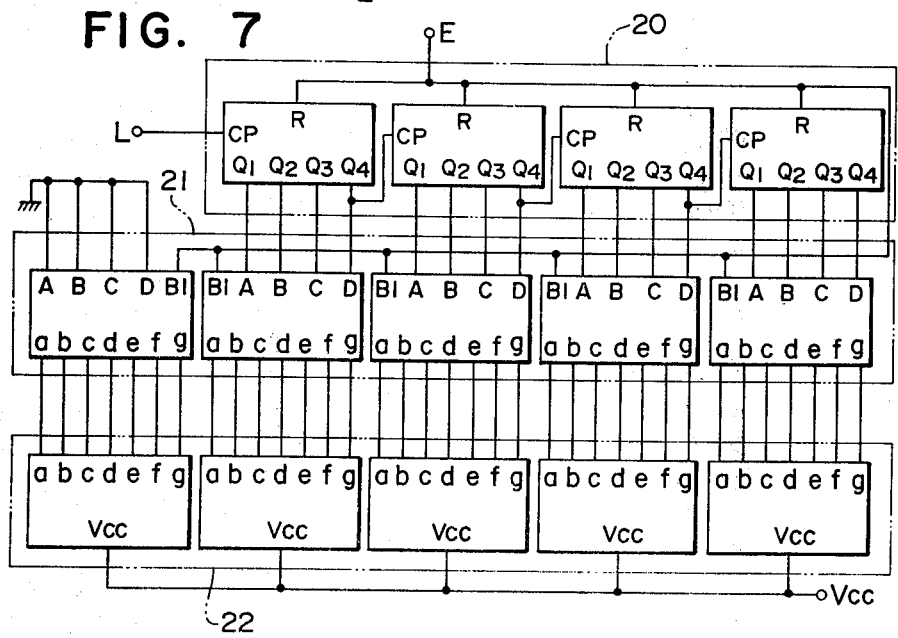
FIG. 7 is a wiring diagram showing specific circuit constructions of still other circuits used in the embodiments of FIGS. 1 and 8.

An embodiment of the present invention will now be described with reference to the accompanying drawings. The general construction of the first embodiment will be described with reference to the block diagram of FIG. 1. In FIG. 1, numeral 1 designates the transmission of an automotive vehicle which transmits the output of a vehicle internal combustion engine to a propeller shaft at a given gear ratio. Numeral 2 designates a meter cable for transmitting the revolutions of the transmission, 3 a gear box for changing the rotational speed of the transmission at a given ratio through the arrangement of its gears, 4 a pulse generator comprising a vehicle speed sensor mounted on a part of the gear box 3 and a wave shaping circuit. The vehicle speed sensor may for example be constructed as shown in FIG. 2 in which a permanent magnet 4a is mounted on the rotating portion of the gear box 3 and a reed switch 4b is arranged at a certain distance from the permanent magnet 4a, whereby the magnetic flux from the permanent magnet 4a is changed in accordance with the rotation of the gears in the gear box 3 to open and close the reed switch 4b, and the output of the reed switch 4b is shaped by the shaping circuit utilizing for example the switching action of a transistor 4c, thus producing a distance pulse signal proportional to the distance traveled, e.g., one distance pulse signal is generated every time the distance of 0.4 m is traveled. Numeral 5 designates a duration pulse generating circuit which may for example be constructed as shown in FIG. 2 to generate duration pulse signals of a predetermined frequency through the use of a crystal oscillator circuit, 6 a vehicle speed detecting circuit by which whether the vehicle speed is for example above or below 10 km/h is detected in accordance with the distance pulse signals from the pulse generator 4. Numeral 7 designates a selection circuit comprising a gating circuit so that when the vehicle speed detected by the vehicle speed detecting circuit 6 is below 10 km/h the duration pulse signals are selected for computing the fare on the time rate plan, whereas when the detected vehicle speed is above 10 km/h, the distance pulse signals are selected for computing the fare on the tariff travel distance plan. Numeral 8 designates a premium fare computing circuit for increasing the number of the pulse signals from the selection circuit 7 in accordance with a selected premium rate, 9 a premium fare switch consisting of a locking type push button switch which is closed for calculating the fare on the premium rate system and which may be constructed as shown in FIG. 4. Numeral 10 designates a counter circuit for counting the number of the pulse signals supplied from the premium fare computing circuit 8, 11 a basic distance signal circuit comprising for example a plurality of devices each having a switching mechanism such as switches, e.g., as shown in FIG. 5, 12 units of such switches for recording in binary code form a number of pulses corresponding to the basic distance, e.g., 3,750 pulses corresponding to the basic travel distance of for example 1.5 km. Numeral 12 designates a fixed additional distance signal circuit comprising a plurality of devices having a switching mechanism such as switches, e.g., as shown in FIG. 5, 12 units of such switches for recording in binary code form a number of pulses corresponding to the fixed additional distance, e.g., 900 pulses corresponding to the additional unit travel distance of for example 360 m. Numeral 13 designates a selection circuit for selecting the basic distance signal from the basic distance signal circuit 11 when a tariff travel switch 14 or the premium fare switch 9 or both are closed, whereas the fixed additional distance signal from the fixed additional distance signal circuit 12 is selected when an output pulse is generated from a comparison circuit 15 which will be described later. Numeral 14 designates the tariff travel switch consisting of a locking type push button switch which is closed for tariff traveling purposes, 15 the comparison circuit consisting of a gating circuit which compares the number of the pulses selected by the selection circuit 13 and the number of the pulses counted by the counter circuit 10 for generating an output pulse when the two numbers are equal to each other. This output pulse of the comparison circuit 15 is used to reset the counter circuit 10. Numeral 16 designates a pulse generating circuit which generates a number of pulses corresponding to the basic fare signal that will be described later when the premium fare switch 9 and/or the tariff travel switch 14 are closed, and which generates a number of pulses corresponding to the fixed additional fare signal that will be described later when the comparison circuit 15 generates an output pulse. Numeral 17 designates a basic fare signal circuit consisting of a plurality of devices each having a switching mechanism such as switches, e.g., as shown in FIG. 6, five units of such switches for recording in binary code form a number of pulses, e.g., 17 pulses corresponding to the basic fare of for example 170 yen. Numeral 18 designates a fixed additional fare signal circuit consisting of a plurality of devices each having a switching mechanism such as switches, e.g., as shown in FIG. 6 five units of such switches for recording in binary code form a number of pulses, e.g., three pulses corresponding to the fixed additional fare of for example 30 yen. Numeral 13' designates a selection circuit which selects the basic fare signal from the basic fare signal circuit 17 when the premium fare switch 9 and/or the tariff travel switch 14 are closed, and which selects the fixed additional fare signal from the fixed additional signal circuit 18 when the comparison circuit 15 generates an output pulse. Numeral 20 designates a fare counter circuit comprising for example four decade counters connected in cascade as shown in FIG. 7 for adding the number of the pulses supplied from the pulse generating circuit 16 to calculate the fare, 21 a decoder circuit for converting the total count of the fare counter circuit 20 into a five-position actuating signal and which may be comprised of for example 4 decoders connected respectively to the associated decade counters of the fare counter circuit 20 and a single decoder having its input grounded. Numeral 22 designates a fare indicator which indicates a fare corresponding to the traveled distance and the traveled time in accordance with the five-position actuating signal and which comprises five indicating tubes connected respectively to the associated decoders of the decoder circuit 21 as shown in FIG. 7, 23 an empty car switch designed so that the closing of the switch 23 resets the fare counter circuit 20 and the counter circuit 10 and at the same time the premium fare switch 9 and the tariff travel switch 14 are opened in response to the opening of the empty car switch 23, 24 a charging switch designed so that in response to the closing of the charging switch 24, the premium fare switch 9 and the tariff travel switch 14 are opened and thus the application of the duration pulse signals to the premium fare computing circuit 8 from the selection circuit 7 is stopped when charging the fare. In other words, the premium fare switch 9, the tariff travel switch 14, the empty car switch 23 and the charging switch 24 are composed of known selector switches so that it is impossible to close two or more of these switches simultaneously.

Next, the construction of the vehicle speed detecting circuit 6 will be described with reference to FIG. 2. In FIG. 2, numeral 61 designates a reset signal generating circuit comprising inverter gates 61a, 61b and 61d, NAND gates 61c, 61e and 61f, resistors 61g and 61h, and capacitors 61i and 61j. Numeral 62 designates a counter circuit, 62a and eight-bit binary counter consisting of a combination of conventional J-K flip-flops, 62b a NAND gate for generating an output signal when the count of the counter 62a attains a given value, e.g., 128 bits. Numeral 63 designates a discrimination circuit comprising inverter gates 63a and 63b, NAND gates 63c and 63d, R-S flip-flops 63e and 63f, a resistor 63g and a capacitor 63h. The duration pulse generating circuit 5 comprises a clock signal generating circuit 51 composed of for example a crystal oscillation circuit, a frequency dividing circuit 52 (e.g., a 1/256 frequency divider) composed of a binary counter for generating duration pulse signals each thereof proportional to a predetermined time interval, and a synchronization circuit 53. The selection circuit 7 comprises NAND gates 7a, 7b and 7c.

The detailed circuit constructions of the premium fare switch 9, the tariff travel switch 14, the empty car switch 23 and the charging switch 24 are shown in FIG. 4, and the output signal of the switches 9, 14, 23 and 24 are respectively inverted by transistors 9a, 14a, 23a and 24a and the inverted signals are then applied to the associated circuits.

On the other hand, as shown in FIG. 2, the clock pulse generating circuit 51 of the duration signal generating circuit 5 is provided with a clock pulse output terminal 51b for delivering the clock pulses through a protective circuit 51a comprising a transistor, a diode, etc. Further, as shown in FIG. 4, a tariff turnover signal output terminal 9d is provided for the tariff travel switch 14 and the premium fare switch 9 to deliver the tariff turnover signal through a NAND gate 9b and a protective circuit comprising a transistor, a diode, etc., and a tariff discrimination signal output terminal is also provided for the tariff travel switch 14 and the premium fare switch 9 so that a signal indicating whether the taxi is engaged, is delivered through a NAND gate 14b and a protective circuit 14c comprising a transistor, a diode, etc. Also provided for the NAND gate 14b and the pulse generator 4 is a tariff distance signal output terminal 24d for delivering the tariff distance signal through a NAND gate 24b and a protective circuit 24b comprising a transistor, a diode, etc., and the pulse generator 4 is also provided with a total travel distance signal output terminal 4e for delivering the total travel distance signal through a protective circuit 4d comprising a transistor, a diode, etc.

The output terminals 51b, 9d, 14d, 24d and 4e are connected to record various informations on the driving conditions of a taxi on the associated channels of a magnetic tape recorder through a magnetic head assembly which is not shown. By recording such informations on the driving conditions of a taxi on a magnetic tape in this manner, the driving conditions of the taxi can be controlled simply and easily.

The counter circuit 10, the basic distance signal circuit 11, the fixed additional distance signal circuit 12, the selection circuit 13 and the comparison circuit 15 are constructed as shown by the detailed circuit diagrams of FIG. 5. In FIG. 5, numerals $13a_1$ to $13a_{12}$, $13b_1$ to $13b_{12}$ and $13c_1$ to $13c_{12}$ designate NAND gates, $13d$ an R-S flip-flop, $15a_1$ to $15a_{12}$ exclusive OR gates, $15b_1$ to $15b_{12}$ inverter gates, and $15c$ a NAND gate.

The selection circuit 13', the pulse generating circuit 16, the basic fare signal circuit 17 and the fixed additional fare signal circuit 18 are constructed as shown by the detailed circuit diagrams of FIG. 6. In FIG. 6, numerals $13a'_1$ to $13a'_5$, $13b'_1$ to $13b'_5$ and $13c'_1$ to $13c'_5$ designate NAND gates, 16a an R-S flip-flop, 16b a pulse oscillator, 16c a counter circuit, $16d_1$ to $16d_5$ exclusive OR gates, $16e_1$ to $16e_5$ inverter gates, 16f a NAND gate.

In FIGS. 2 through 7, symbol $V_{cc}$ designates a positive voltage input terminal for a DC power supply, and symbols A, B, C, D, E, F, G, H, M, N and O designate terminals which are respectively connected to the terminals designated by the identical reference symbols.

The individual circuits shown in FIGS. 2, 3, 4 and 7 are also used in the second embodiment (FIG. 8) which will be described later.

Figure 3:
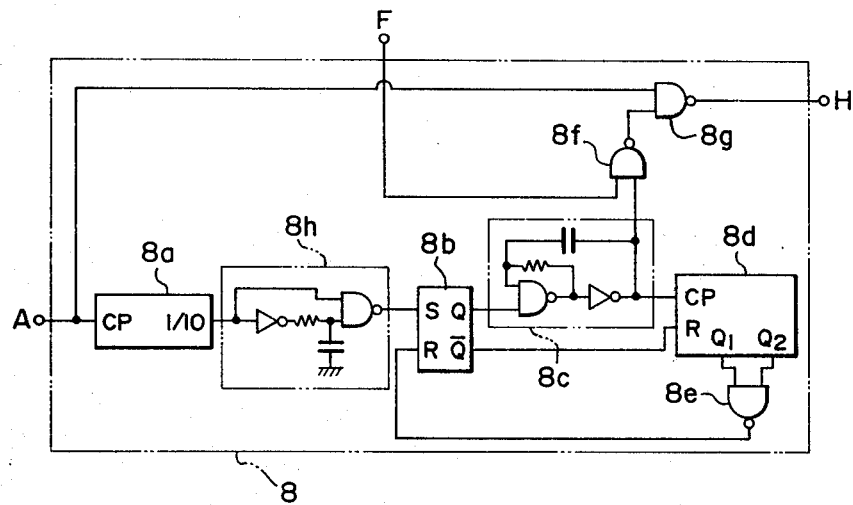

The construction of an exemplary form of the premium fare computing circuit 8 will be described with reference to FIG. 3. In FIG. 3, numeral 8a designates a decade counter circuit which generates an output pulse for every 10 pulses received, 8h a set pulse generating circuit which generates an output signal in response to the rise of the output signal of the decade counter circuit 8a, 8b an R-S flip-flop which is set by the output of the set pulse generating circuit 8h and which generates an output signal at its output terminal Q. Numeral 8c designates a pulse generating circuit in which an oscillation circuit operates to generate pulses during the time that the output signal of the R-S flip-flop 8b remains on at its output terminal Q, 8d a counter circuit which counts the number of pulses generated from the pulse generating circuit 8c and which is reset by an output signal generated at an output terminal $\overline{Q}$ of the R-S flip-flop 8b. Numeral 8e designates a checking circuit comprising a NAND gate circuit which compares the number of the pulses counted by the counter circuit 8d with the number of the additional pulses, e.g., two pulses for the premium rate of 20 percent, so that if the two numbers are equal to each other, an output pulse is generated. Numeral 8f designates a gating circuit consisting of a NAND gate designed so that when the premium fare switch 9 is in the depressed position, the pulse signals generated by the pulse generating circuit 8c are applied to an additional circuit 8g comprising a NAND gate circuit which adds the pulse signals from the gating circuit 8f and the pulse signals from the selection circuit 7 together.

With the construction described above, the premium fare computing circuit 8 operates as follows. The pulse signals corresponding to the vehicle speed and the travel time are applied to the decade counter circuit 8a for frequency by a factor of 10, and its output signal is supplied to the set pulse generating circuit 8h. The set pulse generating circuit 8h generates an output pulse signal in response to the rise of the output signal of the decade counter 8a, and this output signal sets the R-S flip-flop 8b. Consequently, the Q output terminal of the R-S flip-flop 8b goes to a "1" level, so that the oscillator circuit of the pulse generating circuit 8c starts oscillating to generate pulse signals. The pulse signals are counted by the counter circuit 8d, so that when the output of the counter circuit 8d becomes equal to two pulses corresponding to the premium rate of for example 20 percent, the checking circuit 8e generates an output signal to reset the R-S flip-flop 8b. When this occurs, the pulse generating circuit 8c generates an output signal consisting of two pulses which are applied to the gating circuit 8f, and in this way the addition circuit 8g adds two pulse signals from the gating circuits 8f to every 10 pulses of the pulse signals corresponding to the vehicle speed and the travel time, and eventually the number of the pulses corresponding to the tariff travel distance and time is multiplied by a factor of 1.2 and applied to the counter circuit 10. Consequently, essentially the same effect is obtained as if the tariff travel distance and time were multiplied by a factor of 1/1.2 when driving at a 20 percent premium rate.

Next, the operation of the taxi fare meter according to the above-described first embodiment of the invention is as follows. When the driver of a taxi carrying a passenger or passengers closes the tariff travel switch 14, the selection circuit 13 selects 3,750 pulses corresponding to the basic travel distance of for example 1.5 km which were preliminarily set by the switching mechanisms of the basic distance signal circuit 11. On the other hand, the selection circuit 13' selects a number of pulses, e.g., 17 pulses corresponding to the basic fare of for example 170 yen which were preliminarily set by the switching mechanisms of the basic fare signal circuit 17, so that the pulse generating circuit 16 generates an output signal consisting of 17 pulses which are in turn counted by the fare counter circuit 20 for causing the fare indicator 22 to indicate thereon the sum of 170 yen.

With the taxi now in motion, each time the distance traveled reaches 0.4 m a single distance pulse is generated from the pulse generator 4, and the basic value "17" of the fare counter circuit 20 is indicated as the basic fare of 170 yen on the fare indicator 22 through the decoder circuit 21 until a total of 3,750 pulses are applied to the counter circuit 10.

When the distance traveled by the taxi becomes equal to 1.5 km so that the number of the distance pulses counted by the counter circuit 10 reaches 3,750, the comparison circuit 15 generates an output pulse signal which is in turn applied to the pulse generating circuit 16 and the selection circuit 13. When this occurs, the selection circuit 13 selects a total of 900 pulses corresponding to the travel distance of 360 m which were preliminarily set by the switching mechanisms of the fixed additional distance signal circuit 12.

On the other hand, the selection circuit 13' selects a total of three pulses corresponding to the fixed additional fare which were preliminarily set by the switching mechanisms of the fixed additional fare signal circuit 18, and at the same time the pulse generating circuit 16 generates three pulse signals which are in turn added to the basic value 17 in the counter circuit 20. Consequently, the total count (the basic count + 3) of the counter circuit 20 advances to "20", and this total count 20 is indicated as 200 yen on the fare indicator 22 through the decoder circuit 21. Simultaneously, the counter circuit 10 is reset by the output of the comparison circuit 15. With the taxi continuing to travel, the fare indicator 22 continues to indicate the sum of 200 yen until the number of the distance pulses applied to the counter circuit 10 from the pulse generator 4 equals a total of 900 pulse signals corresponding to the fixed additional distance signal, and the comparison circuit 15 again generates an output pulse signal when the number of the distance pulses received by the comparison circuit 15 eventually reaches 900. The output pulse signal from the comparison circuit 15 is applied to the pulse generating circuit 16 and the selection circuit 13. Consequently, the selection circuit 13 selects from the fixed additional distance signal circuit 12 the total of 900 pulses corresponding to the fixed additional distance of 360 m. On the other hand, the selection circuit 13' selects from the fixed additional fare signal circuit 18 the total of three pulses corresponding to the fixed additional fare, and at the same time the pulse generating circuit 16 generates three output pulse signals so that "3" is added to the total count of 20 in the fare counter circuit 20. Consequently, the total count of the counter circuit 20 becomes "23" and this total count 23 is indicated as the fare of 230 yen on the fare indicator 22 through the decoder circuit 21. Simultaneously, the counter circuit 10 is reset by the output of the comparison circuit 15. Thereafter, each time the fixed distance of 360 m is traveled, the above-described process is repreated, and the fare corresponding to the current total distance traveled is indicated on the fare indicator 22. When the passenger has got off thus emptying the taxi, the empty car switch 23 is closed so that the fare counter circuit 20 and the counter circuit 10 are reset, and the tariff travel switch 14 is opened thus resetting the meter to the initial state.

Next, in computing and registering the fare due on the basis of a time rate during a traffic jam or the like, the taxi meter according to the first embodiment operates as follows. The vehicle speed detecting circuit 6 which counts the number of the pulses from the pulse generator 4 to switch the meter to the operating mode which computes the fare on the basis of the time rate, comes into operation first. The vehicle speed detecting circuit 6 measures the period between the generated distance pulses, so that when the measured period is less than a predetermined time interval, that is, when the speed of the taxi drops below a predetermined speed, an output is generated from the vehicle speed detecting circuit 6. When this occurs, the distance pulses from the pulse generator 4 are no longer applied to the premium fare computing circuit 8 through the selection circuit 7, and the duration pulse signals from the duration pulse generating circuit 5 are applied to the premium fare computing circuit 8 through the selection circuit 7. In other words, when the vehicle speed drops below the predetermined speed, the fare due is computed on the basis of the time rate in the similar manner as the above-described computation of the fare according to the distance rate system.

With the first embodiment described above, where different charging systems are employed for different business areas and different classes of taxis or when the charging system is changed, the switching mechanisms of the basic distance signal circuit 11 and the fixed additional distance signal circuit 12 as well as the switching mechanisms of the basic fare signal circuit 17 and the fixed additional fare signal circuit 18 may be operated to preset them respectively to the desired basic and fixed additional distance signals and the basic and fixed additional fare signals.

While, in the first embodiment described above, the basic distance signal circuit 11, the fixed additional distance signal circuit 12, the basic fare signal circuit 17 and the fixed additional fare signal circuit 18 are respectively comprised of a large number of switching mechanisms consisting of switches, each of these circuits may be comprised of switching mechanisms composed of a printed board having a thin metal film printed thereon to form the necessary wiring for a binary code corresponding to the desired basic distance signal, fixed additional distance signal, basic fare signal or fixed additional fare signal and a printed board mount with printed board holes for removably receiving the printed board, so that the printed board fitted in the printed board receiving holes of the printed board mount may be replaced with a different printed board having a thin metal film printed thereonto form the necessary wiring for any given binary code to readily change the charging systems.

Further, while, in the above-described first embodiment, the basic distance signal circuit 11, the fixed additional distance signal circuit 12, the basic fare signal circuit 17 and the fixed additional fare signal circuit 18 are respectively comprised of switching mechanisms such as switches to facilitate the changing of the distance signals for the basic and fixed additional distance signal circuits 11 and 12 as well as the changing of the fare signals for the basic and fixed additional fare signal circuits 17 and 18, the distance signals of the fare signals alone may be changed and the circuits for the unchanged signals may be of a simple construction which can be formed with soldered joints or the like, though the latter signals cannot be readily changed, or in certain circumstances all the signal circuits 11, 12, 17 and 18 may be of a simple construction that can be provided with soldered joints or the like.

Furthermore, while, in the above-described first embodiment, at the instant that the vehicle speed drops below a predetermined value, the number of the duration pulses which are generated from the duration pulse generating circuit 5 is counted by the counter circuit 10 in place of the distance pulses from the pulse generator 4, it is of course possible to arrange so that the counter circuit 10 counts only the distance pulses from the pulse generator 4.

Still furthermore, while, in the above-described first embodiment, the premium fare computing circuit 8 is provided so that the pulse signals generated in proportion to the traveled distance (and time) are counted by the decade counter circuit 8a to generate one output pulse signal for every 10 pulses counted and the output pulse signal is used to cause the pulse generating circuit 8c to generate a number of pulses corresponding to any given premium rate, e.g., two pulses for the 20 percent premium rate, which are in turn added to the pulse signals generated in proportion to the traveled distance (and time), if the premium rate is $n$ percent, in place of the decade counter 8a, a premium pulse generating circuit may be used with a scale-of-K counter for frequency dividing the distance pulse signals (and the time pulse signals) by a factor of K, so that the premium pulse generating circuit generates N pulses in accordance with the output signal of the scale-of-K counter to satisfy $K \cdot n \times (1/100)$ and thereby to provide the premium fare computing circuit 8 of any given premium rate.

It will thus be seen from the foregoing that the taxi fare meter according to the first embodiment shown in FIG. 1 has a great advantage that since the pulse signals generated in proportion to the traveled distance (and time) are counted by a scale-of-K counter so that each time K pulse signals are received by the scale-of-K counter, a premium pulse generating circuit generates N pulses which correspond to a given premium rate $n$ and which satisfies a relatiion $K \cdot n \times \times (1/100)$ and the N pulses are added to the pulse signals generated in proportion to the traveled distance (and time), the K pulse signals for the usual tariff travel are increased to $(K + N)$ pulse signals when traveling at the premium rate thus giving the same effect as if the travel distance and time for the same fare are multiplied by $(K + N)/K$,7 and in this way the fare increased by $n$ percents is indicated on a fare indicator, whereby reducing the size and weight of the premium fare mechanism as compared with the conventional mechanical premium fare mechanisms, ensuring the computation of premium fares for the traveled distance (and time) with a high degree of accuracy, making the apparatus less susceptible to supply voltage variations and ambient temperature changes and designing with integrated circuits possible, and improving reliability in operation through the use of digital techniques.

Figure 8:
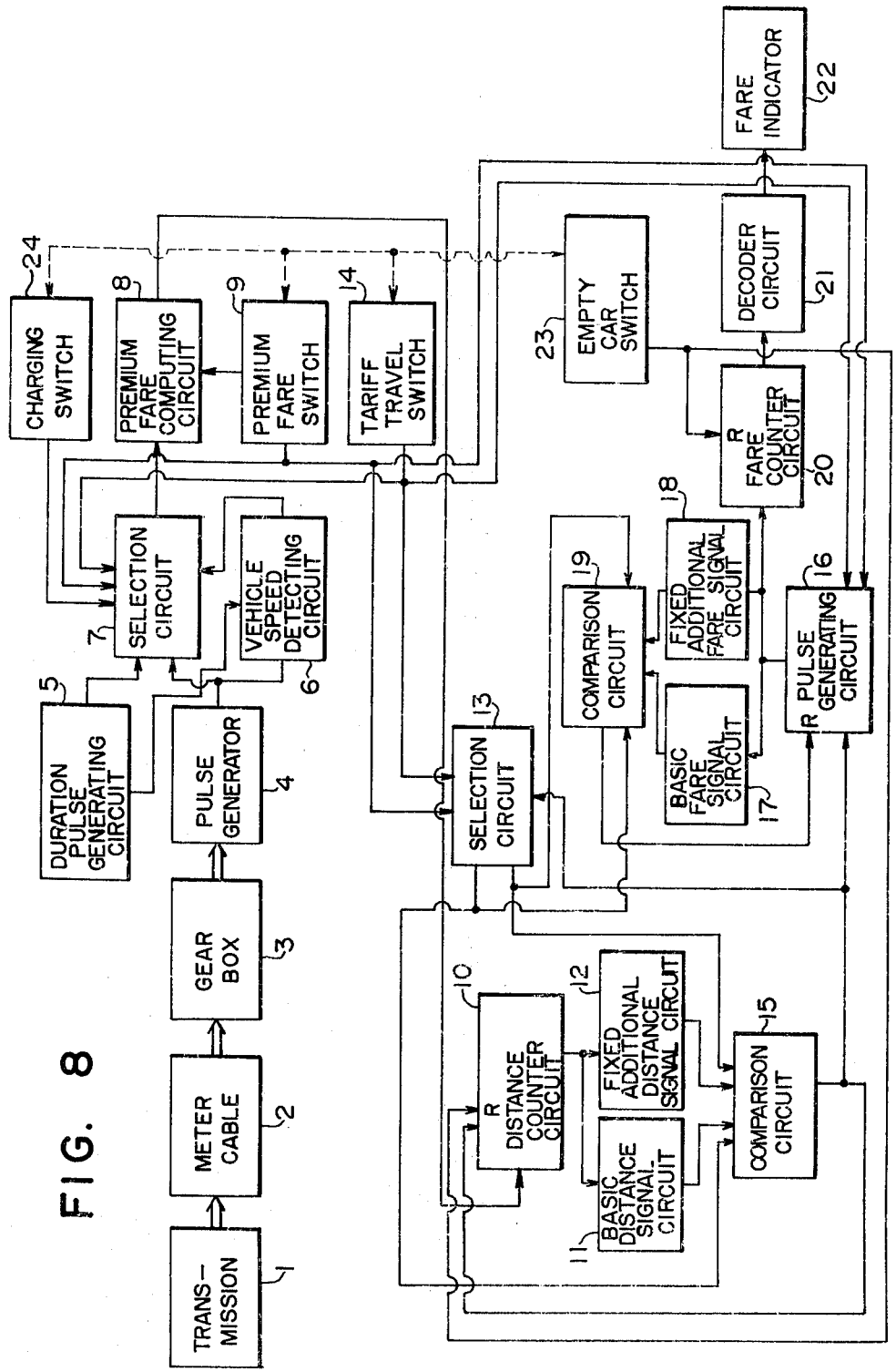
FIG. 8 is a block diagram showing a second embodiment of the electronic taxi fare meter according to the present invention.

A second embodiment of the present invention will now be described with reference to FIGS. 8 through 10. The general construction of the second embodiment will be described with reference to the block diagram of FIG. 8. In FIG. 8, numeral 1 designates the transmission of an automotive vehicle, 2 a meter cable, 3 a gear box, 4 a pulse generator, 6 a vehicle speed detector, 7 a selection circuit, 8 a premium fare computing circuit, 9 a premium fare switch, 14 a tariff travel switch, 20 a fare counter circuit, 21 a decoder circuit, 22 a fare indicator. The detailed circuit constructions of these elements are identical with those illustrated in FIGS. 2, 3, 4 and 7 and described with reference to the first embodiment shown in FIG. 1.

Figure 9:
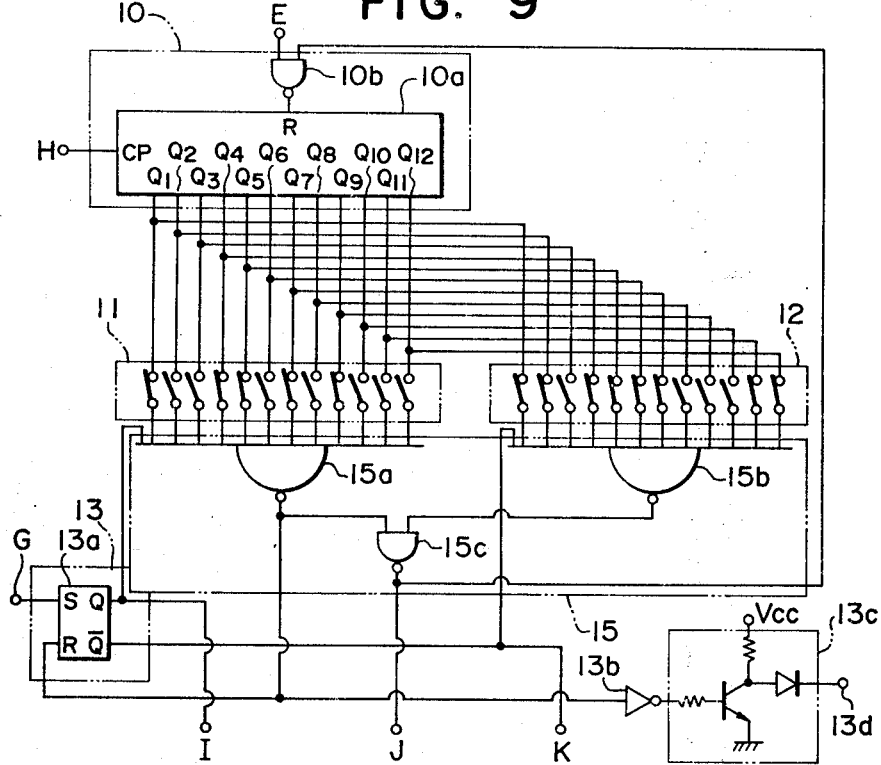
FIGS. 9 and 10 are wiring diagrams showing specific circuit constructions of some of the circuits used in the embodiment of FIG. 8.

Numeral 10 designates a distance counter circuit for counting the pulse signals supplied from the premium fare computing circuit 8, 11 a basic distance signal circuit comprising a plurality of switching mechanisms such as switches, e.g., as shown in FIG. 9 in which 12 units of such switches are arranged to record in binary code the number of pulses corresponding to the basic distance, e.g., a total of 3,750 pulses corresponding to the basic travel distance of for example 1.5 km. Numeral 12 designates a fixed additional distance signal circuit comprising a plurality of switching mechanisms such as switches, e.g., as shown in FIG. 9 in which 12 units of such switches are arranged to record in binary code the number of pulses corresponding to the fixed additional distance, e.g., a total of 900 pulses corresponding to the fixed additional distance of for example 360 m. Numeral 13 designates a selection circuit whereby when a tariff travel switch that will be described later and/or the premium fare switch 9 are closed, the basic distance signal from the basic distance signal circuit 11 and the basic fare signal from a basic fare signal circuit 17 that will be described later are selected, whereas when a comparison circuit 15 that will be described later generates an output, the fixed additional distance signal from the fixed additional distance signal circuit 12 and the fixed additional fare signal from a fixed additional fare signal circuit 18 that will be described later are passed. Numeral 15 designates the comparison circuit comprising a gating circuit for comparing the number of the pulses selected through the selection circuit 13 and the number of the pulses counted by the counter circuit 10 and generating one output signal when the two numbers become equal to each other, and the output of the comparison circuit 15 is used to reset the distance counter circuit 10. Numeral 16 designates a pulse generating circuit which generates a number of pulses corresponding to the basic fare signal that will be described later when the premium fare switch 9 and/or the tariff travel switch 14 are closed and which generates a nmber of pulses corresponding to the fixed additional fare signal that will be described later when the comparison circuit 15 generates an output pulse. Numeral 17 designates a basic fare signal circuit comprising a plurality of switching mechanisms such as switches, e.g., as shown in FIG. 10 in which five units of such switches are arranged to record in binary code the number of pulses corresponding to the basic fare, e.g., a total of 17 pulses corresponding to the basic fare of for example 170 yen. Numeral 18 designates a fixed additional fare signal circuit comprising a plurality of switching mechanisms such as switches, e.g., as shown in FIG. 10 in which five units of such switches are arranged to record in binary code the number of pulse signals corresponding to the fixed additional fare, e.g., a total of three pulses corresponding to the fixed additional fare of for example 30 yen.

The operation of the vehicle speed detecting circuit 6 constructed as shown in FIG. 2 will now described. The pulse generator 4 generates a distance pulse signal corresponding to the vehicle speed. A reset signal generating circuit 61 generates a reset signal at the rise time and the fall time of the distance pulse signals. The reset signal is applied to the reset terminal of a counter 62a to reset its count, and the reset signal is also applied to an inverter gate 63a and a NAND gate 63d. At the instant that the resetting of the counter 62a is completed, the counter 62a starts counting the number of the clock pulse signals generated from a clock pulse signal generating circuit 51 of the duration pulse generating circuit 5. A NAND gate 62b is connected so that it generates an output signal when the count of the counter 62a becomes equal to a predetermined value, that is, when it counts up to 128 pulses.

In this case, since there is one reset signal for each half period of the distance pulse signals, the frequency value of the clock pulse signals is selected so that a total of 128 clock pulse signals are generated during the half period of the distance pulse signal corresponding to a threshold vehicle speed. In this way, when the speed of the taxi is above the threshold vehicle speed, the duration of the half period of the distance pulse signal becomes shorter than the duration of the time period corresponding to the total of 128 clock pulse signals, with the result that the duration of the period of the reset signal becomes shorter than that of the total of 128 clock pulse signals and hence the NAND gate 62b generates no output signal. On the contrary, when the vehicle speed becomes lower than the threshold vehicle speed, the period of the reset signal becomes longer than the time period for the total of 128 clock pulse signals and hence the NAND gate 62b generates an output signal. On the other hand, at the instant that the reset signal terminates, a discrimination circuit 63 generates a set signal through its inverter gates 63a and 63b, a NAND gate 63c, a resistor 63g and a capacitor 63h, and this set signal is used to set an R-S flip-flop 63e and maintain its output terminal Q at the 1 level. Under these conditions, when there is no output signal from the NAND gate 62b, that is, when the vehicle speed is higher than the threshold speed, the output terminal Q of the R-S flip-flop 63e remains at the 1 level so that a NAND gate 63d generates a 0 pulse signal in response to the application of the next reset signal. This 0 pulse signal is applied to the reset terminal of an R-S flip-flop 63f so that its negative phase output terminal $\overline{Q}$ is held at the 1 level and the positive phase output terminal Q is held at the 0 level. On the contrary, when there is an output signal from the NAND gate 62b, that is, when the vehicle speed is lower than the threshold speed, the output signal from the NAND gate 62b is applied to the reset terminal of the R-S flip-flop 63e and the set terminal of the R-S flip-flop 63f, so that the positive phase output terminal Q and the negative phase output terminal of the R-S flip-flop 63e are respectively held at the 0 level and the 1 level, and the positive phase output terminal Q and the negative phase output terminal $\overline{Q}$ are respectively held at the 1 level and the 0 level. Under these circumstances, the application of the reset signal to the NAND gate 63d cannot satisfy the NAND logic, that is, it does not generate a 0 output signal so that the positive phase output terminal Q of the R-S flip-flop 63f is held at the 1 level and its negative phase output terminal $\overline{Q}$ is held at the 0 level. Consequently, when the vehicle speed is higher than the threshold speed, the positive phase output terminal Q of the R-S flip-flop 63f is held at the 0 level and its negative phase output terminal $\overline{Q}$ is held at the 1 level, whereas when the vehicle speed is lower than the threshold speed, the positive phase output terminal $\overline{Q}$ is held at the 1 level and the negative phase output terminal Q is held at the 0 level. These signals are applied to the selection circuit 7 so that depending on whether the vehicle speed is higher or lower than the threshold speed, the selection circuit 7 selects either the duration pulse signals or the distance pulse signals. In other words, when the vehicle speed is higher than the threshold speed, NAND gates 7b and 7c are opened to apply the distance pulse signals from the pulse generator 4 to the premium fare computing circuit 8, whereas when the vehicle speed is lower than the threshold speed, NAND gates 7a and 7c are opened to apply the duration pulse signals from the duration pulse generating circuit 5 to the premium fare computing circuit 8. In this case, since the pulse period of the distance pulse signals is the same with that of the duration pulse signal when the vehicle speed is at the threshold speed and since the counter 62a counts the input pulses during the half period of the distance pulse signals, the relationship between the predetermined count M e.g., 128 pulses of the counter 62a and the frequency division ratio $1/m$ of a frequency dividing circuit 52 is such that there holds a relation $M=(m/2)$.

Consequently, if, for example, the count N of the counter 62a is selected 128 pulses, then the division ratio of the frequency dividing circuit 52 is 1/256. Further, since a synchronization circuit 53 generates a reset signal and resets the frequency division circuit 53 when the vehicle speed drops below the threshold speed to cause the positive phase output terminal Q of the R-S flip-flop 63f to change from the 0 to the 1 level, at the instant that this change-over takes place, the clock pulse signals from the clock pulse signal generating circuit 51 are applied to the frequency dividing circuit 52 to generate duration pulse signals, thereby maintaining the required synchronization between the duration pulse signals and the distance pulse signals.

As shown in FIG. 9, the distance counter 10 comprises a binary counter 10a and a NAND gate 10b, the selection circuit 13 comprises an R-S flip-flop 13a, and the comparison circuit 15 comprises NAND gates 15a, 15b and 15c. On the other hand, as shown in FIG. 10, the pulse generating circuit 16 comprises an R-S flip-flop 16a, a pulse oscillator 16b and a counter circuit 16c consisting of a binary counter, and a comparison circuit 19 comprises NAND gates 19a, 19b and 19c and an inverter gate 19d.

Figure 10:
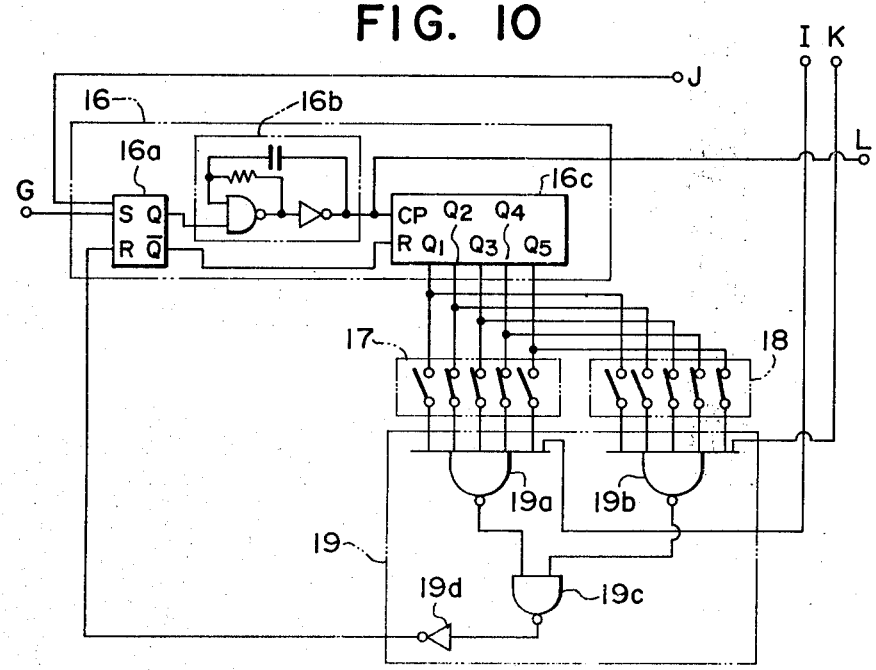

Further, a terminal E in FIG. 4 is connected to terminals E in FIGS. 7 and 9, a terminal G in FIG. 4 is connected to a terminal G in FIG. 9 and a terminal G in FIG. 10, a terminal H in FIG. 3 is connected to a terminal H in FIG. 9, and terminals I, J and K in FIG. 9 are respectively connected to terminals I, J and K in FIG. 10.

On the other hand, as shown in FIG. 2, the clock pulse generating circuit 51 of the duration signal generating circuit 5 is provided with a clock pulse output terminal 51b for delivering the clock pulses through a protective circuit 51a comprising a transistor, a diode, etc. Further, as shown in FIG. 4, a tariff turnover signal output terminal 9d is provided for the tariff travel switch 14 and the premium fare switch 9 to deliver the tariff turnover signal through a NAND gate 9b and a protective circuit comprising a transistor, a diode, etc., and a tariff discrimination signal output terminal is also provided for the tariff travel switch 14 and the premium fare switch 9 so that a signal indicating whether the taxi is engaged, is delivered through a NAND gate 14b and a protective circuit 14c comprising a transistor, a diode, etc. Also provided for the NAND gate 14b and the pulse generator 4 is a tariff distance signal output terminal 24d for delivering the tariff distance signal through a NAND gate 24b and a protective circuit 24d comprising a transistor, a diode, etc., and the pulse generator 4 is also provided with a total travel distance signal output terminal 4e for delivering the total travel distance signal through a protective circuit 4d comprising a transistor, a diode, etc. Further, as shown in FIG. 9, a NAND gate 15a of the fixed additional distance signal 15 is provided with a fixed additional distance turnover signal output terminal 13d for delivering the fixed additional distance turnover signal through an inverting gate 13b and a protective circuit 13c comprising a transistor, a diode, etc. The output terminals 51b, 9d, 14d, 24d, 4e and 13d are connected to record various informations on the driving conditions of a taxi on the associated channels of a magnetic tape recorder through a magnetic head assembly which is not shown. By recording such informations on the driving conditions of a taxi on a magnetic tape in this manner, the driving conditions of the taxi can be controlled simply and easily.

Next, the overall operation of the taxi fare meter according to the second embodiment will be described. When the driver of a taxi carrying a passenger or passengers closes the tariff travel switch 14, the selection circuit 13 selects the number of pulses, e.g., a total of 3,750 pulses corresponding to the basic travel distance of 1.5 km and preestablished by the switching mechanisms of the basic distance signal circuit 11. The selection circuit 13 also selects the number of pulses, e.g., a total of 17 pulses corresponding to the basic fare of 170 yen and preestablished by the switching mechanisms of the basic fare signal circuit 17, and the pulse generating circuit 16 generates pulse signals. When the pulse generating circuit 16 generates a total of 17 pulse signals, the comparator 19 generates an output pulse to reset the pulse generating circuit 16, and the total of 17 pulse signals from the pulse generating circuit 16 is counted by the fare counter circuit 20 causing the fare indicator 22 to indicate the fare of 170 yen through the decoder circuit 21 (since the input of the units decoder is grounded, the indicating tube corresponding to the units decoder always indicates the numeral 0). With the taxi set in motion, each time the distance traveled reaches 0.4 m, one distance pulse is generated from the pulse generator 4, and the basic value 17 of the fare counter circuit 20 is indicated as the basic fare of 170 yen on the fare indicator 22 through the decoder circuit 21 until the distance counter circuit 10 receives the total of 3,750 pulse signals.

Then, when the distance traveled by the taxi reaches 1.5 km so that the total number of the distance pulses applied to the counter circuit 10 reaches 3,750 pulses, the comparison circuit 15 generates an output pulse signal, and this output pulse signal is in turn applied to the pulse generating circuit 16 and the selection circuit 13. Consequently, the selection circuit 13 selects a total of 900 pulses corresponding to the fixed travel distance of 360 m and preestablished by the switching mechanisms of the fixed additional distance signal circuit 12, and at the same time a total of three pulses corresponding to the fixed additional fare of 30 yen and preestablished by the switching mechanisms of the fixed additional fare signal circuit 18 are selected. Consequently, the pulse generator 16 generates pulse signals so that at the instant that a total of three pulse signals are generated from the pulse generating circuit 16, the comparison circuit 19 generates an output pulse to reset the pulse generating circuit 16, and the three pulse signals from the pulse generating circuit 16 are added to the basic value 17 in the counter circuit 20. Consequently, the total count of the counter circuit 20 advances to 20 (the vasic value + 3), and the total count 20 is indicated as the current fare of 200 yen on the fare indicator 22 through the decoder circuit 21. Simultaneously, the counter circuit 10 is reset by the output of the comparison circuit 15. With the taxi continuing to travel, the fare indicator 22 continues to indicate the fare of 200 yen until the total of 900 distance pulses corresponding to the fixed additional distance signal are applied to the counter circuit 10, and at the instant that the number of the distance pulses applied reaches a count of 900, the comparison circuit 15 again generates an output pulse signal which is in turn applied to the pulse generating circuit 16 and the selection circuit 13. Consequently, the selection circuit 13 selects from the fixed additional distance signal circuit 12 the total of 900 pulses corresponding to the fixed additional distance of 360 m and at the same time the total of three pulses corresponding to the fixed additional fare of 30 yen are selected from the fixed additional fare signal circuit 18. When this occurs, the pulse generating circuit 16 generates pulse signals so that when the pulse generating circuit 16 generates a total of three pulse signals, the comparison circuit 19 generates an output pulse to reset the pulse generating circuit 16, and the three signals from the pulse generating circuit 16 are added to the total count 20 in the fare counter circuit 20. Consequently, the current total count of the counter circuit 20 advances to 23, and it is then indicated as the fare of 230 yen on the fare indicator 22 through the decoder circuit 21. Simultaneously, the counter circuit 10 is reset by the output pulse of the comparison circuit 15. Thereafter, each time the fixed additional distance of 360 m is traveled, the above-described process is repeated and the fare corresponding to the current total distance traveled is indicated on the fare indicator 22. When it is necessary to ask for payment of the fare due upon drawing up to a destination, the charging switch 24 is closed so that the tariff travel switch 14 is opened and the duration pulse signals from the duration pulse generator 5 are no longer counted by the distance counter circuit 10. Thus, the sum indicated on the fare indicator 22 represents the fare due. After the passenger has got off thus emptying the taxi, the empty car switch 28 is closed so that the fare counter circuit 20 and the counter circuit 10 are reset, and at the same time a signal is applied to the blank terminal of each of the decoders in the decoder circuit 21 to terminate the indication of the fare indicator 22 and the charging switch 24 is simultaneously opened, thus resetting the taxi fare meter to the initial state.

Next, in operating the second embodiment for computing and registering the fare due on the basis of a premium rate system during midnight hours, the premium fare switch 9 is closed so that the gating circuit 8f in the premium fare computing circuit 8 is opened, and n pulses, e.g., two pulses corresponding to a predetermined premium rate of for example 20 percent are applied from the pulse generating circuit 8c to the addition circuit 8g through the gating circuit 8f for every 10 pulses applied from the selection circuit 7 to the addition circuit 8g whose output pulses are in turn applied to the distance counter circuit 10. Consequently, the number of the pulses applied to the distance counter circuit 10 is 1.2 times the number of pulses applied to the counter circuit 10 for the corresponding tariff distance traveled, and essentially this has the same effect of increasing the tariff distance traveled by 1/1.2 times.

Next, in computing and registering the fare due on the basis of a time rate during a traffic jam or the like, the vehicle speed detecting circuit 6 which counts the number of the pulses from the pulse generator 4 to switch the meter to the operating mode that computes the fare due on the basis of the time rate, comes into operation. As mentioned earlier, the vehicle speed detecting circuit 6 digitally measures the period between the generated distance pulses, so that when the measured period is less than a predetermined time interval, that is, when the speed of the taxi drops below a predetermined speed, a 1 output is generated at the negative phase output terminal $\overline{Q}$ of the R-S flip-flop 63f. When this occurs, the distance pulses from the pulse generator 4 are no longer applied to the premium fare computing circuit 8 through the selection circuit 7, and the duration pulse signals from the duration pulse generating circuit 5 are applied to the premium fare computing circuit 8 through the selection circuit 7. In other words, when the vehicle speed drops below the predetermined speed, as mentioned above, the fare due is computed on the basis of the time rate in the similar manner as the above-mentioned computation of the fare according to the distance rate system.

With the above-described second embodiment, similarly with the first embodiment shown in FIG. 1, where different charging systems are used for different business areas and different classes of taxis or when the charging system is changed, the switching mechanisms of the basic distance signal circuit 11 and the fixed additional distance signal circuit 12 as well as the switching mechanisms of the basic fare signal circuit 17 and the fixed additional fare signal circuit 18 may be operated to preset them respectively to the desired basic and fixed additional distance signals and the basic and fixed additional fare signals.

While, in the second embodiment described above, the basic distance signal circuit 11, the fixed additional distance signal circuit 12, the basic fare signal circuit 17 and the fixed additional fare signal circuit 18 are respectively comprised of a large number of switching mechanisms such as switches, each of these circuits may be comprised of switching mechanisms composed of a printed board having a thin metal film printed thereon to form the necessary wiring for a binary code corresponding to the desired basic distance signal, fixed additional distance signal, basic fare signal or fixed additional fare signal and a printed board mount with printed board holes for removably receiving the printed board, so that the printed board fitted in the printed board receiving holes of the printed board mount may be replaced with a different printed board having a thin metal film printed thereon to form the necessary wiring for any given binary code to readily change the charging systems.

Further, while, in the above-described second embodiment, the basic distance signal circuit 11, the fixed additional distance signal circuit 12, the basic fare signal circuit 17 and the fixed additional fare signal circuit 18 are respectively composed of switching mechanisms such as switches to facilitate the changing of the distance signals for the basic and fixed additional distance signal circuits 11 and 12 as well as the fare signals for the basic and fixed additional fare signal circuits 17 and 18, the distance signals or the fare signals alone may be changed and the circuuits for the unchanged signals may be of a simple construction which can be formed with soldered joints or the like, though the latter signals cannot be readily changed.

Further, while, in the above-described embodiment, the premium fare computing circuit 8 is provided so that the pulse signals generated in accordance with the travel distance (and time) are counted by the decade counter 8a to generate one output signal for every 10 pulses counted and the output pulse signal is used to cause the pulse generating circuit 8c to generate a number of pulse corresponding to any given premium rate, e.g., two pulses for the 20 percent premium rate which are in turn added to the pulse signals generated in accordance with the traveled distance (and time), if the premium rate is n percent, a premium pulse generating circuit may be used with a scale-of-K counter for frequency dividing the distance pulse signals (and the time pulse signals) by a factor of K, so that the premium pulse generating circuit generates N pulses in accordance with the output of the scale-of-K counter to satisfy $N = K \cdot n \times (1/100)$ and thereby to provide the premium fare computing circuit 8 of any given premium rate. Furthermore, if the premium rate is n percent, the premium rate computing circuit 8 may of course be comprised of a first and second counter circuits for respectively frequency dividing the distance pulses (and the duration pulses) by a factor of K and a factor of $$\frac{1 + \frac{n}{100}}{K},$$

and a selection circuit which normally applies to the counter circuit 10 the pulse signals frequency divided by the factor K in the first counter circuit, but applies to the counter circuit 10 the pulse signals frequency divided by the factor of $$\frac{1 + \frac{n}{10}}{K}$$

for computing the fare due on a premium rate. In this case the setting values at the subsequent stage for computing fare must be changed.

Furthermore, while, in the second embodiment described above, the counter circuit 62 comprises the binary counter 62a and the NAND gate 62b for performing the logical operation on the parallel outputs of the binary counter 62a, the counter circuit 62 may be comprised of a binary counter alone so that the threshold vehicle speed is discriminated by the vehicle speed detecting circuit 6 which discriminates whether an output has been generated at a predetermined bit position of the binary counter before its resetting by the distance pulse signal.

It will thus be seen from the foregoing that by virtue of the fact that the taxi fare meter according to the present invention comprises a clock pulse generating circuit for generating clock pulses, a clock counter circuit for counting the number of the clock pulse signals for every half period of the distance pulse signals, a discrimination circuit whereby whether the vehicle speed is higher or lower than a given value is discriminated in accordance with the count of the clock counter circuit, a frequency dividing circuit for frequency dividing the clock pulse signals from the clock pulse generating circuit to generate duration pulse signals, a reset signal generating circuit for resetting the count of the clock counter circuit at each half period of the distance pulse signals, and a selection circuit whereby when the discrimination circuit detects that the vehicle speed is higher than a predetermined value the distance pulse signals are applied to a distance counter circuit, whereas when the detected vehicle speed is lower than the predetermined value the duration pulse signals from the frequency dividing circuit are applied to the distance counter circuit, there is a great advantage that the threshold vehicle speed can be detected digitally with the result that the accuracy of switching between the counting of duration pulse signals and the counting of distance pulse signals is greatly improved, that the construction of circuitry is simplified, and that the time required for the discrimination of the threshold vehicle speed is greatly reduced by accomplishing the discrimination of the threshold vehicle speed at every half period of the distance pulse signals, thereby greatly multiplying the utility of the electronic taxi fare meter of the invention.

There is a further great advantage in that the accuracy of switching between the counting of duration pulse signals and the counting of distance pulse signals is greatly improved by the fact that each time that the discrimination circuit causes a switching, the frequency dividing circuit is reset to start the frequency division of the clock pulse signals and the thus divided clock pulse signals are utilized as the duration pulse signals, thereby synchronizing the duration pulse signals and the distance pulse signals.

What is claimed is:

1. An electronic taxi fare meter of the type in which a pulse generator generates a distance pulse each time a taxi travels a predetermined distance and a distance counter circuit counts and operates on said distance pulses to indicate on fare indicating means a fare corresponding to a total distance traveled in accordance with the result of the operation of said distance counter circuit, said meter comprising:
   a premium fare switch for switching at a premium fare traveling of the taxi; and
   a premium fare computing circuit connected to said premium fare switch and responsive to the switching of said premium fare switch for computing a premium fare in accordance with a predetermined percentage premium rate $n$, said premium fare computing circuit including:
   a scale-of-K counter circuit connected to said pulse generator for dividing the frequency of said distance pulses from said pulse generator by a factor of K;
   a premium pulse generating circuit connected to said scale-of-K counter circuit and responsive to an output signal of said scale-of-K counter circuit for generating N pulses corresponding to said percentage premium rate $n$ and satisfying $N = K \cdot (n/100)$ and
   an addition circuit connected to said premium pulse generating circuit, said pulse generator and said distance counter circuit for adding said N pulses to said distance pulses and the resulting pulses to said distance counter circuit.

2. A meter according to claim 1, wherein said premium pulse generating circuit including an R-S flip-flop connected to said scale-of-K counter and adapted to be set by the output of said scale-of-K counter, a pulse generating circuit connected to the noninverting output terminal of said R-S flip-flop for oscillating and generating output pulses during the time that an output is maintained at said noninverting output terminal, a counter circuit connected to said pulse generating circuit and the inverting output terminal of said R-S flip-flop whereby to count the output pulses of said pulse generating circuit and to be reset by an output generated at said inverting output terminal of said R-S flip-flop, a checking circuit connected to said counter circuit and the reset terminal of said R-S flip-flop for generating an output and resetting said R-S flip-flop when the count of said counter circuit becomes equal to said N pulses, and a gating circuit connected to said pulse generating circuit, said premium fare switch and said addition circuit for opening and closing in accordance with the operation of said premium fare switch to control the application of the output pulses of said pulse generating circuit to said addition circuit.

3. A meter according to claim 2, wherein said addition circuit includes a gating circuit for passing the distance pulses from said pulse generator and the output pulses of said pulse generating circuit.

4. A meter according to claim 1 further comprising a basic distance signal circuit including switching means for preestablishing in binary code form a number of pulses corresponding to a basic distance; a fixed additional distance signal circuit including switching means for preestablishing in binary code form a number of pulses corresponding to a fixed additional distance; a distance comparison circuit for selectively comparing the preestablished signals of said distance signal circuits with the output signal of said distance counter circuit; a tariff travel switch; a distance selection circuit connected to said tariff travel switch, said premium fare switch and said distance comparison circuit whereby when at least one of said premium fare switch and said tariff travel switch is operated, the basic distance signal from said basic distance signal circuit is compared with the output signal of said distance counter circuit in said distance comparison circuit until said distance comparison circuit generates an output signal so that the fixed additional distance signal from said fixed additional distance signal circuit is compared with the output signal of said distance counter circuit in said distance comparison circuit; and an actuating circuit connected to said distance comparison circuit for actuating said fare indicating means in accordance with the output of said distance comparison circuit.

5. A meter according to claim 4 further comprising a protective circuit connected to said tariff travel switch and said premium fare switch for delivering to the outside of said meter a signal generated by the operation of said switches and corresponding to the number of tariff travels.

6. A meter according to claim 4 further comprising a logical circuit connected to said tariff travel switch, said premium fare switch and said pulse generator for performing the logical operation on the distance pulses of said pulse generator and a signal generated by the operation of said switches and indicating whether said taxi is engaged or not, and a protective circuit connected to said logical circuit for delivering said distance pulse signals to the outside of said meter when said taxi is engaged.

7. A meter according to claim 4 further comprising a protective circuit connected to said distance comparison circuit for delivering to the outside of said meter a signal corresponding to the turnover of fixed additional fares in accordance with the output of said distance comparison circuit.

8. A meter according to claim 4, wherein said actuating circuit includes a basic fare signal circuit having switching means for preestablishing in binary code form a number of pulses corresponding to a basic fare; a fixed additional fare signal circuit having switching means for preestablishing in binary code form a number of pulses corresponding to a fixed additional fare; a fare selection circuit connected to said tariff travel switch, said premium fare switch and said distance comparison circuit whereby when at least one of said premium fare switch and said tariff travel switch is operated, the basic fare signal from said basic fare signal circuit is selected, and when said distance comparison circuit generates an output signal the fixed additional fare signal from said fixed additional fare signal circuit is selected; a pulse generating circuit connected to said fare selection circuit, said tariff travel switch, said premium fare switch and said distance comparison circuit whereby when at least one of said premium fare switch and said tariff travel switch is operated, a number of pulse signals corresponding to said basic fare signal selected by said fare selection circuit is generated, and when said distance comparison circuit generates an output signal a number of pulse signals corresponding to said fixed additional fare signal selected by said fare selection circuit is generated; a fare counter circuit connected to said pulse generating circuit for counting the pulse signals generated from said pulse generating circuit; and decoder means connected to said fare counter circuit and said fare indicating means for converting the total count of said fare counter circuit into an actuating signal for actuating said fare indicating means.

9. A meter according to claim 1 further comprising a basic distance signal circuit connected to the output of said distance counter circuit and including switching means for preestablishing in binary code form a number of pulses corresponding to a basic distance; a fixed additional distance signal circuit connected to the output of said distance counter circuit and including switching means for preestablishing in binary code form a number of pulses corresponding to a fixed additional distance; a distance comparison circuit connected to said distance signal circuits for selectively comparing the preestablished distance signals of said distance signal circuits with the output signal of said distance counter circuit; a tariff travel switch; a selection circuit including an R-S flip-flop connected to said tariff travel switch, said premium fare switch and said distance comparison circuit whereby when at least one of said premium fare switch and said tariff travel switch is operated, the basic distance signal from said basic distance signal circuit is compared with the output signal of said distance counter circuit in said distance comparison circuit until said distance comparison circuit generates an output signal so that the fixed additional distance signal from said fixed additional distance signal circuit is compared with the output signal of said distance counter circuit in said distance comparison circuit; and an actuating circuit connected to said distance comparison circuit for actuating said fare indicating means in accordance with the output of said distance comparison circuit.

10. A meter according to claim 9, wherein said actuating circuit includes a pulse signal generating circuit connected to said tariff travel switch, said premium fare switch and said distance comparison circuit for generating a pulse output either when at least one of said switches is operated or when said distance comparison circuit generates an output; a basic fare signal circuit connected to said pulse signal generating circuit and having switching means for preestablishing in binary code form a number of pulses corresponding to a basic fare; a fixed additional fare signal circuit connected to said pulse signal generating circuit and having switching means for preestablishing in binary code form a number of pulses corresponding to a fixed additional fare; a fare comparison circuit connected to said fare signal circuits, said selection circuit and said pulse signal generating circuit whereby when said basic fare signal is selected by said selection circuit said basic fare signal is compared with the pulse output of said pulse signal generating circuit, whereas when said fixed additional fare signal is selected by said selection circuit said fixed additional fare signal is compared with the pulse output of said pulse signal generating circuit, thereby to terminate the generation of the pulse output of said pulse signal generating circuit when said pulse output is equal to said basic fare signal or said fixed additional fare signal; a fare counter circuit connected to said pulse signal generating circuit for counting the pulse signals generated from said pulse signal generating circuit; and decoder means connected to said fare counter circuit and said fare indicating means for converting the total count of said fare counter circuit into an actuating signal for actuating said fare indicating means.

11. A meter according to claim 1 further comprising a clock signal generating circuit for generating clock signals; a frequency dividing circuit connected to said clock signal generating circuit for dividing the frequency of said clock signals to generate duration pulse signals; a reset signal generating circuit connected to said pulse generator for generating a reset signal at each half period of the distance pulse signals generated from said pulse generator; a clock counter circuit connected to said reset signal generating circuit and said clock signal generating circuit for counting the number of said clock pulse signals generated during each half period of said distance pulse signals; a discrimination circuit connected to said clock counter circuit whereby whether the speed of said taxi is higher or lower than a predetermined value is determined in accordance with the count of said clock counter circuit; and a distance/-duration selection circuit connected to said discrimination circuit, said pulse generator, said frequency dividing circuit, said scale-of-K circuit and said addition circuit whereby when said discrimination circuit determines that the vehicle speed is higher than said predetermined value the distance pulse signals from said pulse generator are applied to said scale-of-K counter and said addition circuit, whereas when said discrimination circuit determines that the vehicle speed is lower than said predetermined value the duration pulse signals generated from said frequency dividing circuit are applied to said scale-of-K counter and said addition circuit.

12. A meter according to claim 11 further comprising a synchronization circuit connected to said discrimination circuit and said frequency dividing circuit whereby when the vehicle speed represented by the output of said discrimination circuit changes from a value higher than said predetermined value to one lower than said predetermined value, said frequency dividing circuit is reset to synchronize said transition time and the generation of said duration pulse signals.

13. A meter according to claim 11 further comprising a protective circuit connected to said clock signal generating circuit for delivering to the outside of said meter the clock signals generated from said clock signal generating circuit.

14. A meter according to claim 1 further comprising a protective circuit connected to said pulse generator for delivering to the outside of said meter the distance pulse signals generated from said pulse generator.

15. A meter according to claim 1, wherein said premium pulse generating circuit generates N pulses each time said scale-of-K counter circuit counts K distance pulses.

16. A meter according to claim 1 further comprising selection means for applying to said premium fare computing circuit a duration pulse signal of fixed frequency instead of said distance pulses when the speed to the taxi is lower than a predetermined value.

17. An electronic taxi fare meter of the type in which a pulse generator generates a distance pulse each time a taxi travels a predetermined distance and a distance counter circuit counts and operates on said distance pulses to indicate on fare indicating means a fare corresponding to a total distance traveled in accordance with the result of the operation of said distance counter circuit, said meter comprising:
 a premium fare switch for switching at a premium fare traveling of the taxi; and
 a premium fare computing circuit connected to said premium fare switch and responsive to the switching of said premium fare switch for computing a premium fare in accordance with a predetermined percentage premium rate n, said premium fare computing circuit including:
 premium means connected to said pulse generator for generating N pulses corresponding to said percentage premium rate $n$ and satisfying $N = K \cdot (n/100)$ each time said premium means receives K distance pulses from said pulse generator; and
 an addition circuit connected to said premium means, said pulse generator and said distance counter circuit for adding said N pulses to said distance pulses and the resulting pulses to said distance counter circuit.

18. An electronic taxi fare meter of the type in which a pulse generator generates a distance pulse each time a taxi travels a predetermined distance and a distance counter circuit counts and operates on said distance pulses to indicate on fare indicating means a fare corresponding to a total distance traveled in accordance with the result of the operation of said distance counter circuit, said meter comprising:
 a premium fare switch for switching at a premium fare traveling of the taxi; and
 a premium fare computing circuit connected to said premium fare switch and responsive to the switching of said premium fare switch for computing a premium fare in accordance with a predetermined premium rate represented in the form of decimal fraction, said premium fare computing circuit including:
 counter means connected to said pulse generator for generating an output signal each time said counter means counts a predetermined number of said distance pulses generated from said pulse generator; and
 means connected to said counter means and said distance counter circuit for adding, to said distance pulses, pulses whose number corresponds to the multiplication of said predetermined number of said distance pulses and said premium rate represented in decimal fraction and applying the added pulses to said distance counter circuit.

* * * * *